United States Patent [19]

Morris et al.

[11] 4,256,845
[45] Mar. 17, 1981

[54] POROUS SHEETS AND METHOD OF MANUFACTURE

[75] Inventors: Harold B. Morris, Newnan; Donald G. Bright, College Park, both of Ga.

[73] Assignee: Glasrock Products, Inc., Fairburn, Ga.

[21] Appl. No.: 12,433

[22] Filed: Feb. 15, 1979

[51] Int. Cl.$^3$ .............................................. B29D 27/00
[52] U.S. Cl. ........................................ 521/61; 264/49;
264/127; 264/DIG. 2; 521/65; 521/145;
521/188; 521/919
[58] Field of Search ................... 264/49, 127, DIG. 2;
521/61, 65, 145, 188, 919

[56] References Cited

U.S. PATENT DOCUMENTS

| | | |
|---|---|---|
| 1,142,619 | 6/1915 | Pum et al. . |
| 1,710,617 | 4/1929 | Haddon et al. . |
| 2,175,798 | 10/1939 | Hauser . |
| 2,504,208 | 4/1950 | Locke et al. . |
| 2,542,527 | 2/1951 | Honey et al. . |
| 2,707,201 | 4/1955 | Fernald et al. . |
| 2,846,727 | 8/1958 | Bechtold ................................ 264/49 |
| 2,983,960 | 5/1961 | Jilge . |
| 2,997,448 | 8/1961 | Hochberg ........................... 264/49 X |
| 3,062,760 | 11/1962 | Dermondy . |
| 3,253,542 | 5/1966 | McDonough . |
| 3,281,511 | 10/1966 | Goldsmith ............................ 264/49 |
| 3,376,238 | 4/1968 | Gregorian . |
| 3,407,249 | 10/1968 | Landi . |
| 3,496,000 | 2/1970 | Hull et al. . |
| 3,518,332 | 6/1970 | Sklarchuk et al. ..................... 264/49 |
| 3,556,161 | 1/1971 | Roberts .............................. 264/49 X |
| 3,576,686 | 4/1971 | Schmidle et al. . |
| 3,702,267 | 11/1972 | Grot . |
| 3,763,055 | 10/1973 | White et al. . |
| 3,770,537 | 11/1973 | Elton . |
| 3,773,878 | 11/1973 | Jahnke .................................. 264/49 |
| 3,859,402 | 1/1975 | Bintliff et al. ......................... 264/49 |
| 3,890,417 | 6/1975 | Vallance . |
| 3,930,886 | 1/1976 | Mesiti et al. ....................... 264/49 X |
| 3,930,979 | 1/1976 | Vallance ............................ 264/49 X |
| 3,943,006 | 3/1976 | Baker et al. ....................... 264/49 X |
| 3,968,292 | 7/1976 | Pearman et al. . |
| 3,980,613 | 9/1976 | Bachot et al. ..................... 264/49 X |
| 4,003,818 | 1/1977 | Juillard et al. . |
| 4,049,589 | 9/1977 | Sakane ............................. 264/49 X |
| 4,150,076 | 4/1979 | Baris et al. ........................... 264/49 |
| 4,196,070 | 4/1980 | Chao et al. ....................... 264/49 X |

FOREIGN PATENT DOCUMENTS

| | | | |
|---|---|---|---|
| 1081046 | 8/1967 | United Kingdom . | |
| 1364683 | 8/1974 | United Kingdom ............ | 264/49 |
| 1410313 | 10/1975 | United Kingdom ............ | 264/49 |

OTHER PUBLICATIONS

Whittington; Lloyd R., "Whittington's Dictionary of Plastics", Stamford, Conn., Technomic, ©1968, Preface, pp. 58–60.

*Primary Examiner*—Philip Anderson
*Attorney, Agent, or Firm*—Lane, Aitken, Ziems, Kice & Kananen

[57] ABSTRACT

A porous thermoplastic sheet is formed by adding a material to a polymer latex to passivate the aqueous phase of the latex. An additional material of a preselected particle size, corresponding to the desired pore size of the final product is then added. The latex composition is gelled and is then formed into a sheet. The sheet is dried and cured or sintered and the solubles are extracted therefrom with a solvent. A preferred polymer latex is PTFE.

13 Claims, 3 Drawing Figures

FIG. I.

POROUS SHEETS AND METHOD OF MANUFACTURE

BACKGROUND OF THE INVENTION

1. Field of the Invention

The invention relates to porous plastic sheeted and shaped materials which find utility in a variety of applications, including use as separators, membranes, filters and diaphragms. The invention also relates to a method for the manufacture of such materials.

2. Description of the Prior Art

The addition of a water-insoluble solid additive of a preselected grain size to polymer latices, for the purpose of forming a porous product, is well known in the art. For example, U.S. Pat. No. 2,542,527 discloses a process for producing porous PVC by incorporating water-insoluble particulate starch into the polymer. The starch particles are first swelled and then removed by immersion in an acidic solution. U.S. Pat. No. 2,997,448 discloses a method for producing a porous PTFE by the addition of plaster of Paris to an aqueous dispersion of PTFE. The particulate plaster of Paris is removed from the formed polymer by dissolution in an organic acid. British Pat. No. 1,081,046 also adds a water-insoluble salt to an aqueous dispersion of PTFE, which salt is subsequently removed from the formed product by hydrochloric acid or other solvent. Similar disclosures are made by U.S. Pat. Nos. 3,702,267, 3,890,417 and 3,930,979. While such processes produce a satisfactory porous and microporous products, they also present the problems of cost and handling of acids and other noxious solvents and of waste disposal of the spent solvent.

The prior art also discloses a number of processes for producing porous sheet materials by extraction of a water-soluble filler. Typical is the teaching of U.S. Pat. No. 2,846,727 which discloses a process involving the addition of a water soluble salt to an aqueous dispersion of ACRN. The major problem with such a process is that in the dissolution and recrystallization of the salt which occurs prior to its removal by leaching, it is difficult to control the particle size of the salt or the pore size of the final product.

It is also known to dry-blend various polymers with solid additives of a preselected grain size. For example, U.S. Pat. No. 3,943,006 discloses a process for producing a porous PTFE by dry-mixing PTFE powder with sugar or other crystalline substance. The problem with these processes is that it is difficult to obtain a product of uniform porosity.

SUMMARY OF THE INVENTION

Accordingly, it is an object of the present invention to provide a product of highly uniform porosity which can be produced by removal, from the formed product, of a soluble material of preselected particle size by leaching with a solvent.

It is a further object of the present invention to provide a process in which the parameters can be changed as needed to provide products of differing pore sizes and pore volumes for a wide variety of industrial applications.

In accordance with the present invention, a process is provided for producing a porous polymer sheet material which involves adding a soluble salt to a polymer latex in an amount sufficient to substantially passivate the aqueous phase of the latex. The salt-passivated latex is then heated, agitated and mixed with soluble salt of a preselected particle size corresponding to the desired pore size for the product and in an amount preselected to provide the desired porosity. The heating and agitation is continued until coagulation of the mass results in a dough-like material. The dough is then mechanically worked and formed into a sheet of the desired thickness, which sheet can then be dried, crosslinked or sintered. Finally, the salt is leached from the sheet with an appropriate solvent and air dried to produce the porous product. A preferred polymer latex for use in the process is a PTFE (polytetrafluoroethylene) latex.

One product of the process of the present invention is characterized by an average pore size and pore volume which provides a Gurley air flow of 20–50 ml/min/sq. in. with a 20 oz. cylinder and a 1.0 square inch orifice, a tensile strength of 100–600 psi, a 50–250% elongation at break and an open pore surface.

DETAILED DESCRIPTION OF THE INVENTION

Figure 1:
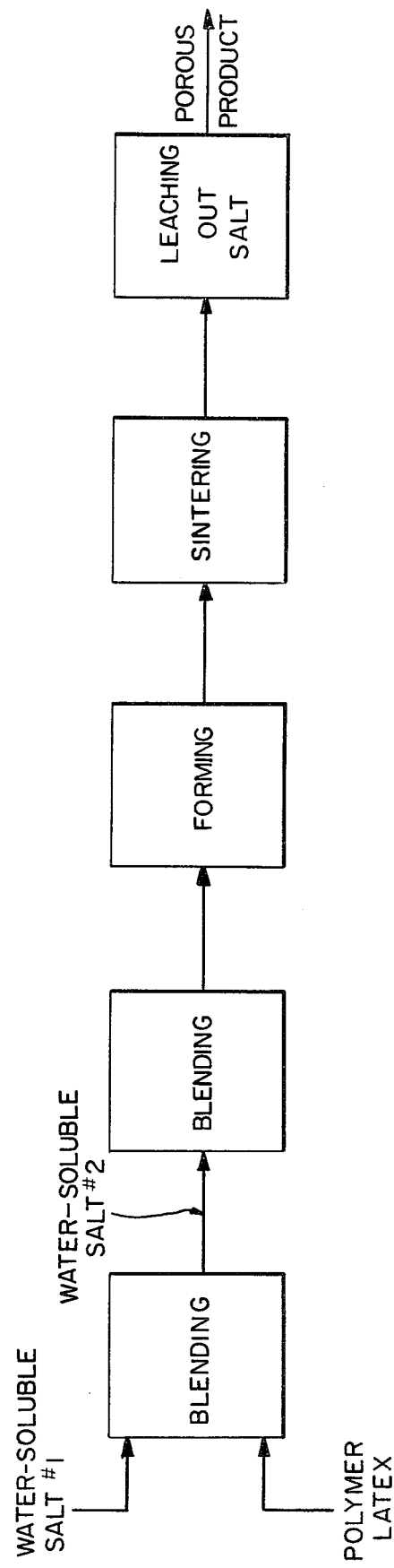
FIG. 1 is a flow chart, schematically illustrating the process of the present invention.
Figure 2:
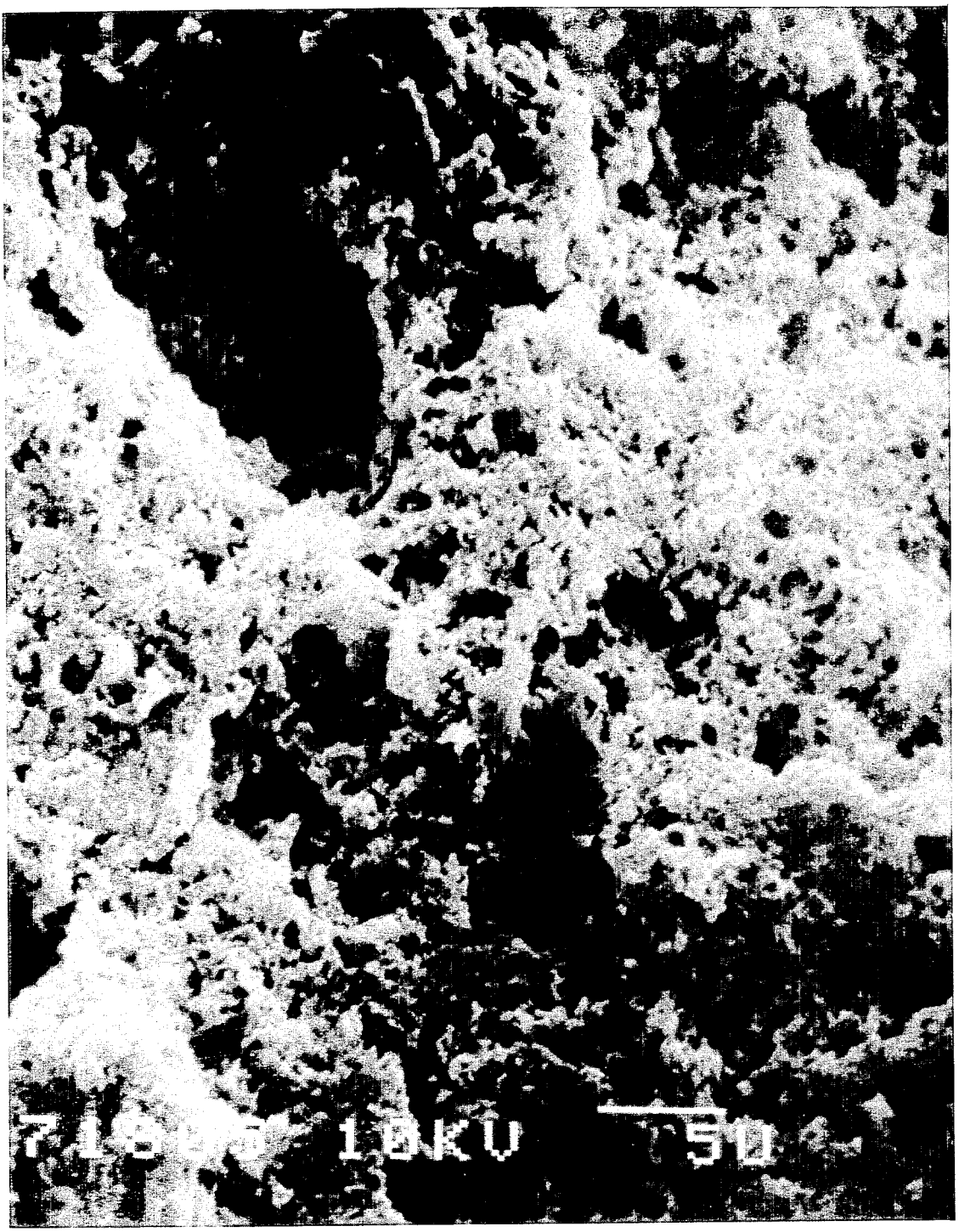
FIG. 2 is a photograph, by scanning electron microscope (2000×), of a product of this invention, specifically, of the surface of a sheet of PTFE having a 70% pore volume and an average pore diameter of approximately one micrometer.
Figure 3:
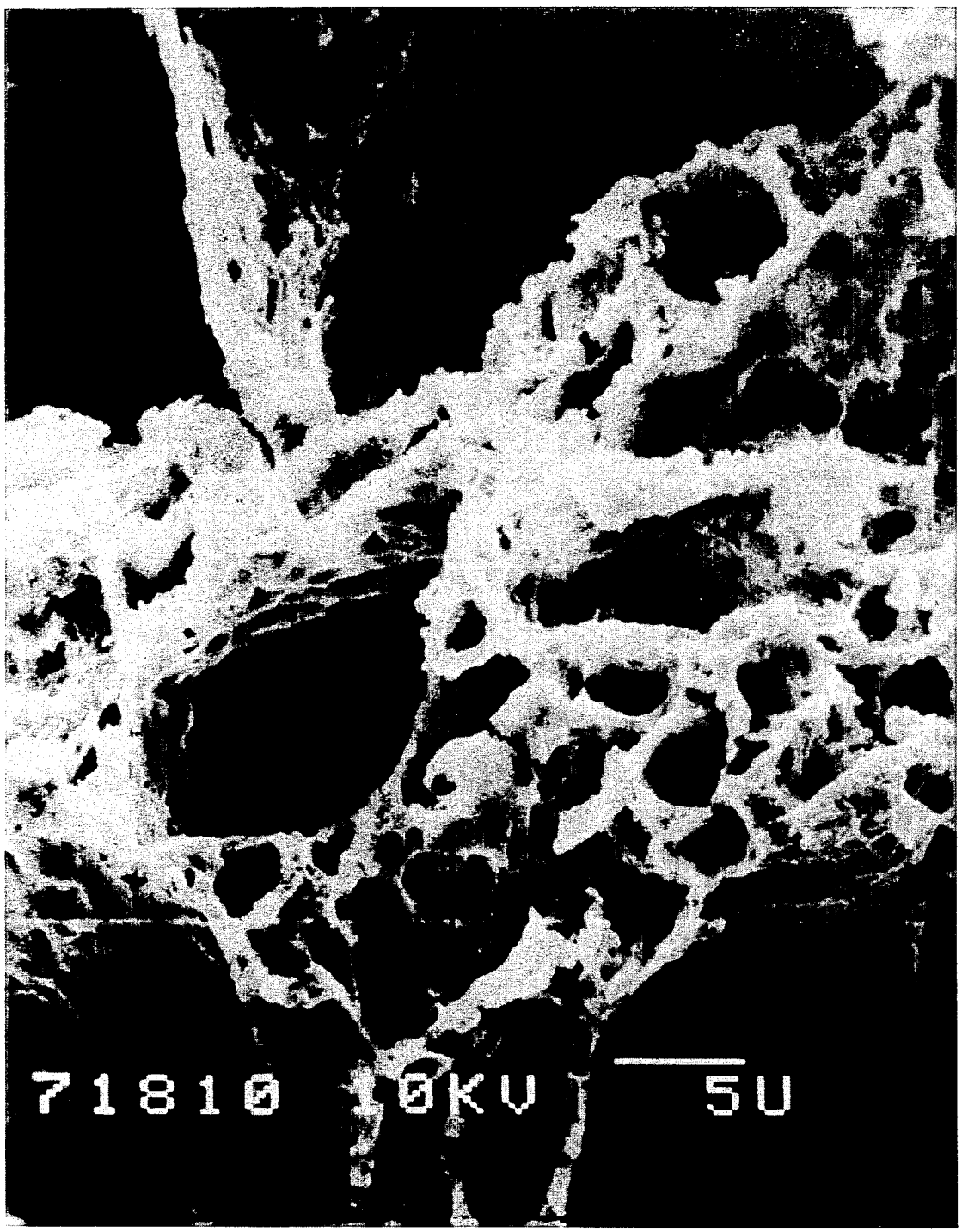
FIG. 3 is a similar photograph (2000×) of a fracture surface of the product shown in FIG. 2, the fracture being produced by immersing the sheet in liquid nitrogen and then breaking.

The process of the present invention can employ, as a starting material, any polymeric latex including latices of natural and synthetic elastomers and latices of polyacrylates, polyvinylacetate, acrylonitrile, etc. However, a latex of PTFE is especially desirable because of its exceptional heat and chemical resistance. In the preferred embodiment, the process starts with a commercial PTFE latex which typically contains approximately 40% by weight water.

In the invention as previously indicated, a salt is added to the polymer latex to completely passivate the aqueous phase, and the salt-containing latex is heated and agitated for dispersion of the salt. The temperature at which the latex is heated during dispersion of said salt is not particularly critical; although in the case of PTFE latices, temperatures above 100° F. tend to cause premature instability of the admixture before dispersion of said salt is complete. In view of these considerations, a temperature of 100° F. or less for PTFE latices is preferred. Agitation of the latex and salt may be by any conventional mixer, including paddle and propeller type mixers.

After passivation of the aqueous phase with a salt, the pore-forming salt of a preselected particle size and amount is added. Since the aqueous phase is already passivated with salt, the pore-forming salt is not dissolved to any significant extent, and thus maintains its identity in terms of particle size and shape. The pore-forming salt may be the same salt as used to passivate the aqueous phase but is preferably a less soluble salt. However, the use of the less soluble salt to passivate the aqueous phase is also considered to be within the scope of the present invention.

The entire latex/salt mixture is heated and stirred until said mixture forms a continuous and coherent dough. The addition of the salt, the heating and the agitation all contribute to the conversion of the latex/salt mixture into a doughlike mass. The temperature at which the latex/salt mixture gels or coagulates is not particularly critical; although in the case of PTFE, temperatures of 80° F. fail to provide coagulation within a reasonable period of time and temperatures above about 100° F. result in such rapid coagulation that the salt or salts cannot be uniformly dispersed in the polymer latex. In view of these considerations, a temperature range of 90°–100° F. with mild agitation for PTFE latices is preferred.

In a preferred embodiment, common salt (NaCl) treated with an anti-caking agent of high solubility, is used to saturate the aqueous phase; and common salt, treated with an anti-caking agent of relatively low solubility, is used as the pore-forming salt. Common salt (NaCl) is commercially available in forms treated with various anti-caking agents, such as 1.5% by weight calcium phosphate, tri basic (commercially known as tricalcium phosphate, TCP) or 500 ppm sodium hexacyanoferrate (II) decahydrate (commercially known as sodium ferrocyanide or yellow prussiate of soda, YPS). Common salt is preferred because of its low cost, but any soluble salt or combination thereof may be used.

As previously noted, the pore-forming salt is added after passivation of the aqueous phase by the first salt, but the timing of the salt addition is not particularly critical. The pore-forming salt may be added before or after heating and agitation of the latex is commenced. However, addition of the salt or salts should be completed before the gellation has proceeded to the point where a uniform admixture is difficult to attain.

The amount and particle size of the pore-forming salt may be varied freely in accordance with the nature of the final product desired. However, as the amount and/or particle size increase, physical strength of the end product decreases.

After the coagulation has proceeded to the point where a dough-like material is formed, that material is mechanically worked by kneading with any conventional kneader or roll-mill. The mechanical working serves a three-fold function in: (1) providing the desired thickness; (2) providing the desired tensile strength; and (3) improving uniformity in the mixture with respect to the dispersion of salt in the polymer. In a preferred embodiment, a roll-mill and/or calender rolls are maintained at a relatively cool temperature, preferably below 110° F., and most preferably at room temperature, in order to minimize loss of moisture and thereby allowing time for sufficient mechanical work to produce a dough which will provide a final product of the desired tensile strength. In a preferred embodiment, a PTFE dough containing 16% by weight moisture is mechanically worked in a roll-mill operation typically consisting of passes through a one-quarter inch nip with the sheet being doubled and rotated 90° for each successive pass. The sheet is then likewise subjected to passes through the calendering rolls with a reduction of about 50% in thickness on each pass, and the sheet being again rotated 90° on each pass. The number of passes is dictated by the desired properties of the end product. This mechanical working yields a final product (after sintering, salt extraction and drying) that will have a tensile strength of at least 100 psi, typically 400–600 psi.

For most end use applications, the mechanical working is continued until the moisture content of the dough is about 10–12% by weight. When the sheet material contains 10% by weight or more of moisture, it may be folded over itself; and the folds, upon a subsequent pass through the roll mill or calender rolls, will completely merge and knit. However, with a water content of less than about 10% by weight, the sheet material when folded over itself and passed through a roll-mill will result in a laminar product which may be peeled apart at the interface.

While the moisture content of the mass is controlled above 10% by weight, it is still capable of assuming a complex shape. In other words, the desired shape of the end-use product can be formed from the dough thus eliminating the need for any post-forming operation. Dough containing more than 10% by weight moisture can also be "laminated" to a suitable reinforcing substrate, such as a substrate of carbon fiber. The term "laminate" may be inaccurate in that the final product may have a structure devoid of any discrete laminae and, rather, assume a uniform composite mass with a continuum of polymer through the pores of the substrate.

On the other hand, for certain end-use applications, it may be desirable to continue mechanical working of the dough to a moisture content of less than 10% by weight. The sheet material may then be laminated with itself prior to additional passes through calender rolls to provide a product having exceedingly thin laminae. These laminae may then be separated to provide ultra-thin sheets.

After mechanically working the material into a sheet containing the desired amount of moisture, the sheet is dried and sintered; for example, in an air-circulating oven. Time and temperature are interrelated in the sintering operation with temperatures being suitably selected at some value within the melting point range of the polymer. In the case of PTFE, the sintering temperature is within the range of 600° F. to 800° F. (316° C. to 427° C.) with sintering at 700° F. (371° C.) for 30 minutes being preferred. Longer times do not change the end product significantly. However, shorter times result in reduced tensile strength and increased percentage elongation at break. At temperatures below 700° F., the tensile strength of the end product decreases, but the percentage elongation at break increases. At sintering temperatures above 800° F., shrinkage upon cooling becomes a problem with the sheet product showing a tendency to curl and fracture.

The sintered sheet is then immersed or sprayed with water to extract the salt. The use of hot water speeds the leaching process and is preferred. The extracted sheet is then dried in an air-circulating oven preferably at about 120° F. (49° C.) for about 60 minutes.

The product is characterized by a high degree of uniformity; i.e., less than 10% variation in porosity across the sheet as measured by mercury intrusion and Gurley air flow techniques. It is also characterized by a high tensile strength of 100–600 psi. The tensile strength of the end product is a function both of the amount of the mechanical work applied in processing and of the amount and particle size of salt or salts incorporated into the polymer dough. Naturally, the higher the percentage of the void volume, the lower the tensile strength.

A particular percent void volume can be closely approximated by introduction of the same percent by weight common salt (NaCl) on a dry basis. In the preferred embodiment, that percent by weight common salt will be constituted of the amount of salt No. 1 necessary for passivation of the aqueous phase (35 parts salt No. 1/100 parts water in the latex aqueous phase) and the balance being by salt No. 2. The pores will be principally formed by salt No. 2 and of a size determined by the size of particles of salt No. 2. However, during processing, salt No. 1 will also recrystallize and contribute to porosity.

The product is further characterized by non-sealed surfaces. By a non-sealed surface, it is meant that the skin porosity is substantially equal to the core porosity. In other words, the interconnected pores extend from the core and are open to the surface. The word "passivate" used herein means the substantial elimination of solubilization action of the aqueous phase on any material subsequently added.

The following examples serve to illustrate preferred embodiments of the present invention.

EXAMPLE 1

11.7 grams of sodium chloride containing 500 ppm of sodium hexacyanoferrate (II) decahydrate as an anti-caking agent (the high solubility salt No. 1) was added to 83.3 grams of TFE latex (DuPont TEFLON® 30 TFE Resin Dispersion) with stirring and moderate heating by immersion of the mixing container in a hot water bath. The stirring and heating was continued until salt No. 1 was dissolved being careful not to heat the solution above 100° F. Then 105 grams of sodium chloride, containing approximately 1.5% by weight of calcium phosphate, tribasic as an anti-caking agent (the less soluble salt No. 2) was added. After completion of the salt No. 2 addition, the stirring was continued, and the mixture maintained at 100° F. for 20 minutes at which time a firm, cohesive dough formed.

When a similar salt latex mixture was stirred at 80° F. for 20 minutes, no coagulation occurred. After 24, 48 and 72 hours at 80° F., with occassional stirring, still no coagulation occurred. When an identical formulation was heated to 120° F. with stirring, coagulation occurred in five minutes.

The composition, coagulated at 100° F. and having a moisture content of about 15% by weight, was passed through a two-roll mill with the rolls spaced at 0.250 inches apart. Ten passes were made with the 0.250 inch milled sheet folded upon itself and turned 90° before each successive pass. After the tenth pass, the moisture content had been reduced to about 12% by weight. This sheet was then subjected to repeated calendering, rotating 90° and reducing the thickness upon each pass by about 50% until a 0.020 inch thickness was achieved. At this point, the moisture content was about 10% by weight. Then the sheet was dried and sintered at 700° F. for 30 minutes, extracted in water at 140° F. for 16 hours and dried in an air-circulating oven at 120° F. for one hour. The tensile strength of the sheet was 550 psi with 250% elongation at the breakpoint. The product had a pore volume of approximately 70% and an average pore size of approximately 1 micrometer.

For purposes of comparison, the mechanical working procedure was modified, using an identical dough. The sheet was processed by only one pass through the two-roll mill and was not rotated upon successive passes through the calender rolls. It was found that the resultant sheet had inadequate green strength for further processing.

In the foregoing example, the particle size of salt No. 2 was less than 50 micrometers and produced a final product having a tensile strength of 550 psi and a Gurley air flow (ml/min/sq. in.) of 30. When the procedure was repeated with salt No. 2 particles within the range of 90-105 micrometers, the result was a final product having a tensile strength of 271 psi and providing a Gurley air flow of 1700 ml/min/sq. in. When repeated with a salt No. 2 particle size of 175-210 micrometers, the result was a tensile strength of 195 psi and Gurley air flow of 6667 ml/min/sq. in.

To demonstrate the attainment and effect of different pore volumes, Example 1 was repeated using different amounts of salt (NaCl) of particle size less than 50 micrometers. In each case, 83.3 grams of TFE resin latex was used (50 grams TFE, 33.3 grams water).

| Salt No. 1 | (gm) No. 2 | Dry Weight Salt | Composition (%) TFE | Approx. Pore Volume (%) |
|---|---|---|---|---|
| 11.7 | 438.2 | 90 | 10 | 90 |
| 11.7 | 105.0 | 70 | 30 | 70 |
| 11.7 | 38.3 | 50 | 50 | 50 |
| 11.7 | 9.7 | 30 | 70 | 30 |
| 5.5 | 0.0 | 10 | 90 | 10 |

In the above, the amount of salt No. 1 to saturate the 33.3 grams of water in each latex sample was determined to be about 11.7 grams at 100° F.

EXAMPLE 2

11.7 grams of sodium chloride containing 500 ppm of sodium hexacyanoferrate (II) decahydrate as an anti-caking agent (the high solubility salt No. 1) was added to 83.3 grams of TFE latex (DuPont TEFLON® 30 TFE Resin Dispersion) with stirring and moderate heating by immersion of the mixing container in a hot water bath. The stirring and heating was continued until salt No. 1 was dissolved being careful not to heat the solution above 100° F. Then 130.8 grams of calcium carbonate was added. After completion of the salt No. 2 addition, the stirring was continued, and the mixture maintained at 100° F. for 20 minutes at which time a firm, cohesive dough formed.

The composition, coagulated at 100° F. and having a moisture content of 15.8% by weight, was passed through a two-roll mill with the rolls spaced at 0.250 inches apart. Ten passes were made with the 0.250 inch milled sheet folded upon itself and turned 90° before each successive pass. After the tenth pass, the moisture content had been reduced to about 12.7% by weight. This sheet was then subjected to repeated calendering, rotating 90° and reducing the thickness upon each pass by about 50% until a 0.020 inch thickness was achieved. At this point, the moisture content was 12.2% by weight. Then the sheet was dried and sintered at 700° F. for 30 minutes, extracted in concentrated hydrochloric acid (36-38%) for 16 hours and then in water at 140° F. for 16 hours, and dried in an air-circulating oven at 120° F. for one hour. The tensile strength of the sheet was 120 psi with 90% elongation at the breakpoint. The product had a pore volume of approximately 70%, an average pore size of approximately 1 micrometer, and a Gurley air flow of 48.5 ml/min/sq. in. with a 20 oz. cylinder and 1.0 square inch orifice. The particle size of the calcium carbonate was less than 50 micrometers.

EXAMPLE 3

14.7 grams of calcium carbonate was added to 83.3 grams of TFE latex (DuPont TEFLON® 30 TFE Resin Dispersion) with stirring and moderate heating by immersion of the mixing container in a hot water bath. The stirring and heating was continued until salt No. 1 had passivated the latex being careful not to heat the solution above 100° F. Then 133.3 grams of calcium carbonate was added. After completion of the salt No. 2 addition, the stirring was continued, and the mixture maintained at 90° F. for 20 minutes at which time a firm, cohesive dough formed.

The composition, coagulated at 90° F. and having a moisture content of 13.2% by weight, was passed through a two-roll mill with the rolls spaced at 0.250 inches apart. Ten passes were made with the 0.250 inch milled sheet folded upon itself and turned 90° before each successive pass. After the tenth pass, the moisture content had been reduced to about 12.8% by weight. This sheet was then subjected to repeated calendering, rotating 90° and reducing the thickness upon each pass by about 50% until a 0.020 inch thickness was achieved. At this point, the moisture content was 10.0% by weight. Then the sheet was dried and sintered at 700° F. for 30 minutes, extracted in concentrated hydrochloric acid (36-38%) for 16 hours and then in water at 140° F. for 16 hours, and dried in an air-circulating oven at 120° F. for one hour. The tensile strength of the sheet was 127 psi with 50% elongation at the breakpoint. The product had a pore volume of approximately 70%, an average pore size of approximately 1 micrometer and a Gurley air flow of 37.1 ml/min/sq. in. with a 20 oz. cylinder and 1.0 square inch orifice. The particle size of salt No. 2 was less than 50 micrometers.

EXAMPLE 4

14.7 grams of calcium carbonate was added to 83.3 grams of TFE latex (DuPont TEFLON® 30 TFE Resin Dispersion) with stirring and moderate heating by immersion of the mixing container in a hot water bath. The stirring and heating was continued until salt No. 1 had passivated the latex being careful not to heat the solution above 100° F. Then 105 grams of sodium chloride with calcium phosphate, tribasic as an anti-caking agent (the less soluble salt No. 2) was added. After completion of the salt No. 2 addition, the stirring was continued, and the mixture maintained at 100° F. for 20 minutes at which time a firm, cohesive dough formed.

The composition, coagulated at 100° F. and having a moisture content of about 16% by weight, was passed through a two-roll mill with the rolls spaced at 0.250 inches apart. Ten passes were made with the 0.250 inch milled sheet folded upon itself and turned 90° before each successive pass. After the tenth pass, the moisture content had been reduced to about 15% by weight. This sheet was then subjected to repeated calendering, rotating 90° and reducing the thickness upon each pass by about 50% until a 0.020 inch thickness was achieved. At this point, the moisture content was about 13% by weight. Then the sheet was dried and sintered at 700° F. for 30 minutes, extracted in water at 140° F. for 16 hours, extracted in concentrated hydrochloric acid (36-38%) for 16 hours, washed in hot water at 140° F. for 16 hours, and dried in an air-circulating oven at 120° F. for one hour. The tensile strength of the sheet was 540 psi with 230% elongation at the breakpoint. The product had a pore volume of approximately 70%, an average pore size of approximately 1 micrometer and a Gurley air flow of 11.0 ml/min/sq. in. with a 20 oz. cylinder and 1.0 square inch orifice. The particle size of salt No. 2 was less than 50 micrometers.

EXAMPLE 5

2 grams of methylated urea-formaldehyde resin were added to 100 grams of 57% urethane latex and well stirred. In a second container, 60 grams of sodium chloride containing 500 ppm of yellow prussate of soda were added to 15 grams of a 33% water solution of Triton X-100® (Rohm and Haas) containing 2.5 grams of Catalyst 50® (Ruco Division of Hooker Chemical Company). The smooth mix was added to the latex-resin mix and stirred until uniformly mixed. 60 grams of sodium chloride containing 1.5% by weight of tribasic calcium phosphate were added directly to the final mix and stirred until smooth.

When heated to 100° F., with stirring, a dough-like mass is obtained. In this example, mechanical working does not affect the tensil strength of this polymer and thus calendering or forming to shape is adequate. After drying and curing for about an hour at 140°-160° F. in air, the product is crosslinked at about 300° F. for one hour. After extraction in hot water and drying, the product is tough and porous.

The foregoing description of various preferred embodiments is not intended to in any way limit the scope of the present invention which is defined by the appended claims. The invention may be embodied in other forms without departing from the spirit and scope of the claims.

What is claimed is:

1. A process for producing a porous polymer sheet comprising:
    (a) adding a first water soluble salt to a polymer latex in an amount sufficient to passivate the aqueous phase of the latex;
    (b) heating and agitating the polymer latex to passivate the aqueous phase;
    (c) adding to the polymer latex passivated with said first salt, a second water soluble salt of a preselected particle size corresponding to the desired pore size for the end-product polymer sheet and in an amount preselected to provide the desired porosity;
    (d) heating and agitating the latex containing said first salt and said second salt until a continuous, coherent dough-like material forms;
    (e) mechanically working the polymer material obtained in step (d);
    (f) forming the material into a sheet of the desired thickness;
    (g) drying and then curing or sintering the sheet;
    (h) extracting said first and second salts from the cured or sintered sheet with solvent; and
    (i) drying the extracted sheet to obtain the porous product.

2. The process of claim 1 wherein said sheet is shaped into a preform prior to drying and sintering.

3. The process of claim 1 wherein said first and second salts are identical.

4. The process of claim 1 wherein said first salt is a salt of relatively high solubility in the aqueous phase, and said second salt is a salt of lesser solubility in the aqueous phase.

5. The process of claim 1 wherein the temperature of the latex is maintained within a range of about 90° to 110° F. throughout steps (b) through (d).

6. The process of claim 1 wherein said mechanical working is accomplished by kneading the dough-like composition.

7. The process of claim 6 wherein said kneading is by passing the sheet through the nip of shaping rolls.

8. The process of claim 7 wherein the sheet is turned 90° on successive passes through the shaping rolls.

9. The process of claim 7 wherein the shaping rolls are maintained below 110° F.

10. The process of claim 1 wherein the mechanical working in step (e) is continued to reduce the moisture content of the mass to 10–12%.

11. The process of claim 1 wherein said mechanical working in step (e) is continued until the moisture content of the material has been reduced sufficiently to prevent the cohesion of two or more layers of said material when said layers are simultaneously passed between rollers thus enabling the ready separation of laminae of the rolled material into thinner sheets.

12. The process of claim 1 wherein said polymer latex is a PTFE latex.

13. The porous PTFE sheet produced by the process of claim 12 having an average pore size and pore volume to provide a Gurley air flow of 20–50 ml/min/sq. in. with a 20 oz. cylinder and a 1.0 inch square orifice, a tensile strength of 100–600 psi, an elongation of 50–250% and an open pore surface.

* * * * *